United States Patent

[11] 3,600,029

| [72] | Inventor | Rudolph Nagel |
| | | 1305 Ainsworth St., Gonzales, Tex. 78629 |
| [21] | Appl. No. | 860,926 |
| [22] | Filed | Sept. 25, 1969 |
| [45] | Patented | Aug. 17, 1971 |

[54] PECAN RETRIEVER
4 Claims, 4 Drawing Figs.

[52] U.S. Cl. .................................................... 294/19 A,
294/99 SAJ
[51] Int. Cl. ...................................................... A01d 11/02
[50] Field of Search ............................................. 294/19.1,
20, 21, 10.4; 306/21—28; 279/77; 287/DIG. 9

[56] References Cited
UNITED STATES PATENTS
1,247,032 11/1917 Surbaugh ..................... 306/21 (UX)
1,379,085 5/1921 Davis ............................ 306/28
2,788,630 4/1957 Nisbet .......................... 294/19.1

*Primary Examiner*—Evon C. Blunk
*Assistant Examiner*—Johnny D. Cherry
*Attorney*—Schellin and Hoffman ABSTRACT: This specification discloses a device intended to be used in retrieving pecans from the ground with a pickup action. The device comprises an elongate rod having an outturned handle at its upper free end and a retrieving receptacle detachably secured to its lower end. The lower end of the rod is formed with two recesses spaced 180° apart and the receptacle carries a spring latch which cooperates with one of these recesses to mount the receptacle on the rod in either one of two diametrically opposed positions to adapt the device for use by either a right-handed or a left-handed person.

PATENTED AUG 17 1971
3,600,029
FIG. 1.
FIG. 2.
FIG. 3.
FIG. 4.
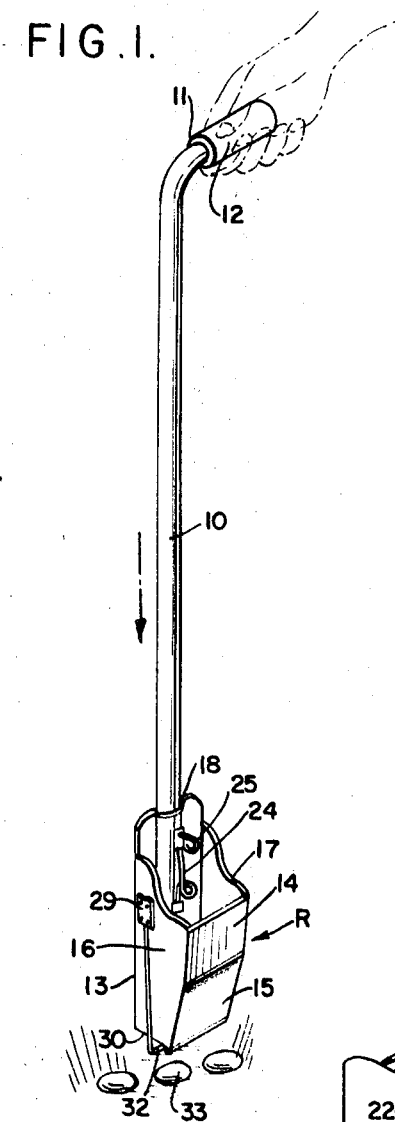
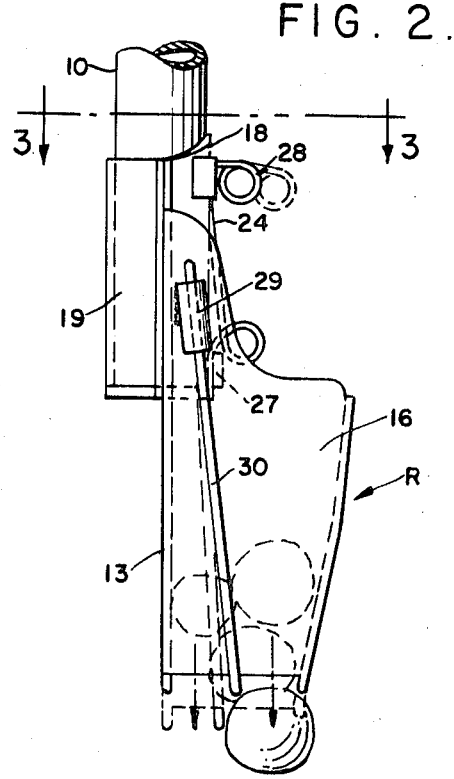
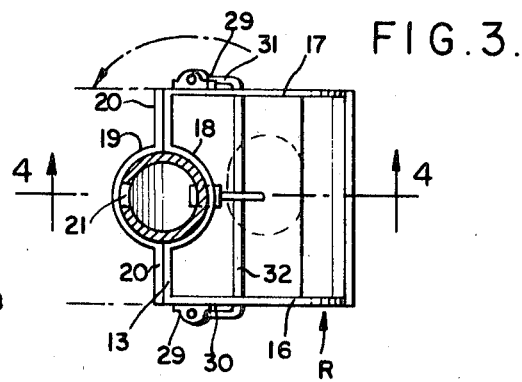
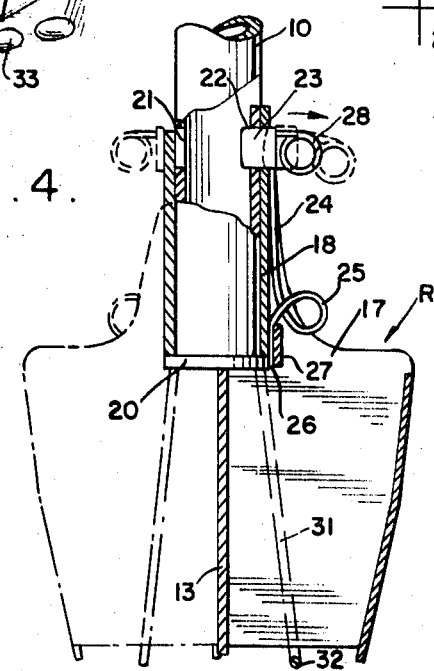
INVENTOR
RUDOLPH NAGEL
BY *Schellin & Hoffman*
ATTORNEYS 3,600,029

PECAN RETRIEVER

The present invention relates to retrieving devices of the type employed to pick up pecans or other nuts from the ground and is concerned primarily with a device of this character which may be used with equal facility by either a right-handed or a left-handed person.

BACKGROUND OF THE INVENTION

Pecans grow on trees and while a large proportion of such nuts may be harvested by picking them off the trees many fall on to the ground into many types of surface conditions. In some cases the ground surface may be clear but in other instances it will take the form of matted grass and other growths in which the pecans become entangled or partially embedded.

It has been recognized as desirable to provide a worker engaged in retrieving such fallen pecans with a device which enables him to pick them up off the ground surface while remaining erect. Known devices for this purpose may be characterized as including a wand or rod having a handle or hand grip at its upper end and an open bottom receptacle secured to its lower end. Some form of spring biased mechanism is associated with the open bottom and includes bars which are deflected or give as the receptacle is pushed over a nut. Thus the pecans pass the bars to enter the receptacle and are retained therein by the bars when they return to their original condition under the spring action.

The receptacle also has an open top and after it is filled to a desired degree with pecans its contents are discharged through the open top by the worker manipulating the end to elevate the receptacle over some type of receiver.

With a user standing in any one location on the ground it is desirable that he be enabled to pick up all the pecans within his reach. This means that the retrieving device must be susceptible of manipulation to force the receptacle, with its spring biased retainer over a pecan that may be somewhat remote and entangled in growth. Some of the devices now available may be adequate to accommodate these conditions when used by a person for whom they are designed, that is, either a right-handed or a left-handed persons. However, known devices of the character with which this invention is concerned are not susceptible of use with equal facility by both right and left-handed users.

OBJECT OF THE INVENTION

The invention has, as its primal objective, the provision of a pecan retriever that includes a wand or rod having an outturned portion at its upper end that is constituted a handle, and a pecan pickup and receiving receptacle adjustably mounted on its lower end so that the position of the receptacle on the rod map be adjusted into one of two positions relative to the handle whereby it is adapted for use with maximum ease, effectiveness and efficiency by either a right-handed or left-handed person.

More in detail, an object is to provide, in a pecan retriever of the character noted, a hopper like receptacle that is open at both its top and bottom and which comprises four walls. The latter include parallel sidewalls and front and rear walls which converge towards the open bottom. A spring of generally U shape is mounted on the receptacle by having the upper ends of the legs of the U anchored to the outer faces of the sidewalls and the back of the U extending across the open bottom in a position intermediate the front and rear walls.

Another object is to provide, in a device of the type noted, a receptacle having a socket that receives the lower end of the wand. The wand and socket are formed with cooperating elements of a releaseable detent which holds the receptacle in one of two angular positions, 180° apart, relative to the wand.

Various other more detailed objects and advantages of the invention such as arise in connection with carrying out the above noted ideas in a practical embodiment will in part become apparent and in part be hereinafter stated as the description of the invention proceeds.

SUMMARY OF THE INVENTION

The foregoing objects are achieved by providing a pecan receiver in which the handle extends outwardly of the rod at an angle approaching a normal relation and the lower portion of the rod is formed on its outer surface with two recesses in diametrically opposed relation. A spring latch has one end anchored to the socket and is biased into position in which it is received in one of the recesses, thus functioning as a detent inhibiting relative rotation of the wand and receptacle.

When properly adjusted for use by either a right or left handed person the receptacle will always be in front of the wand which is the position in which it may be most effectively used.

For a full and more complete understanding of the invention reference may be had to the following description and accompanying drawing wherein:

FIG. 1 is a perspective of the pecan retriever of this invention in a position of use.

FIG. 2 is a detailed elevation, on an enlarged scale, but taken from one side, of the receptacle and the lower portion of the wand.

FIG. 3 is a horizontal section through the wand, being taken about on the plane represented by the line 3—3 of FIG. 2, and depicting the receptacle in top plan; and FIG. 4 is a vertical section through the wand and receptacle taken about on the plane represented by the line 4—4 of FIG. 3, and showing one position of the receptacle in full line and the other position in phantom.

Referring now to the drawing wherein like reference characters denote corresponding parts a pecan retriever embodying the precepts of this invention is shown as comprising a wand or rod 10, a handle 11 at the upper end of rod 10, and a receptacle identified in its entirety by the reference character R mounted on the lower end of rod 10.

Wand 10 may be of any construction deemed desirable but the tubular form illustrated may be considered as the preferred form. Handle 11 is preferably integral with wand 10 and is bent outwardly therefrom at an angle approaching 90°. A hand grip 12 may be applied to handle 11.

Receptacle R comprises a rear wall 13, a front wall made up of sections 14 and 15, both of which are inclined relative to rear wall 13, with the lower section 15 having the greater angle of inclination, and sidewalls 16 and 17 in substantially parallel relation. Thus the front and rear walls converge towards the open bottom defined by the lower edges of the four walls.

Rear wall 13 is formed with a semicylindrical socket portion 18 at its upper end. Complementing the latter is another semicylindrical member 19 having flanges 20 (FIG. 3) secured to rear wall 13 in any preferred manner. Members 18 and 10 define a socket that receives the lower end portion of rod 10. The lower end of the socket may be closed as by the end wall shown at 20 (FIG. 4).

The lower end portion of rod 10 is formed with two recesses or slots 21 (FIGS. 3 and 4) in diametrically opposed relation. With end portion of rod 10 received in the socket one of these slots is substantially midway of the side edges of socket member 18. Opposite to this slot, member 18 is cut out to form a slot 22 which aligns with that slot 21. An element 23 of a detent passes through the aligned slots and is carried at one end of a spring arm 24. The latter includes a coil 25 and its lower end 26 is anchored in a bracket 27 mounted on the lower end of socket member 18. The upper end of spring arm 24 is formed with a finger engaging loop 28.

Spring arm 24 biases the detent 23 into the locking position illustrated in full line of FIG. 4 but may be pulled outwardly by finger loop 28 to withdraw detent 23 from the aligned slots and permit the wand 10 to be rotated 180° to bring the other slot 21 into alignment with slot 22.

Mounted on the outer surface of each side wall 16 and 17 in the upper portion thereof is an anchor bracket 29. A wire spring of generally U-shape comprises legs 30 and 31 and a base or back 32 extends across the open bottom of the receptacle, spanning the space between sidewalls 16 and 17 and positioned intermediate rear wall 13 and front wall section 15.

OPERATION

While the manner of using the subject pecan retriever is believed to be obvious from the illustrations of the drawing and description of parts outlined above it may be briefly described as follows:

It is assumed that a plurality of pecans 33 (FIG. 1) are on the ground and entangled in grass or other growth as illustrated. The user of the device first adjusts receptacle R on wand 10 to bring the two into proper angular relation depending on whether the worker is right- or left-handed. This is accomplished by pulling on finger loop 28 to withdraw detent 23 from the aligned slots 21 and 22 and rotating rod 10 in the socket.

The worker now grasps handle 11 and receptacle R will be positioned in front of the wand. He now forces receptacle R over a pecan 33. Engagement of the latter with back 32 of the spring will cause the back 32 to deflect and permit the pecan to enter the receptacle. Once this happens back 32 returns to its original position in which it retains that pecan and others which may have been picked up previously in the receptacle. This action is permitted by the elasticity and resiliency of legs 30 and 31 the upper ends of which are anchored in brackets 29.

The converging rear and front walls impart a capacity to the receptacle of receiving a fairly large number of pecans.

After this capacity is reached the worker empties the contents of receptacle R through its open top into any suitable receiver provided for that purpose.

While a preferred specific embodiment of the invention is hereinbefore set forth, it is to be clearly understood that the invention is not to be limited to the exact constructions, mechanism and devices illustrated and described because various modifications of these details may be provided in putting the invention into practice.

What I claim is:
1. In a pecan retriever
   a. a wand having a pair of diametrically opposed recesses adjacent to its lower end,
   b. an out turned handle at the upper end of said wand at an angle approaching 90° with respect to the wand,
   c. a receptacle having an open bottom and a rear wall lying in substantially the same plane as that of the handle and wand and including a socket that is rotatable into two diametrically opposed positions in which it receives the lower end of the wand, said socket being formed with a slot which aligns with one of said recesses,
   d. A U-shaped spring mounted on the receptacle and including a back extending across said open bottom to form with a wall of the receptacle yieldable pickup means; and
   e. a spring latch mounted on said socket and including an element of a detent which passes through said slot and into the recess aligned therewith, said receptacle being mounted on the lower end of said wand and rotatable to either of said two diametrically opposed positions and in either position projects from the wand to permit the retriever to be used by either a right- or left-handed user with a maximum of efficiency and convenience.

2. The pecan retriever of claim 1, in which the receptacle includes sidewalls in parallel relation and a front wall that converges towards the rear wall towards the open bottom and in which the U-shaped spring includes legs overlying the sidewalls with the upper ends of the spring legs anchored to the sidewalls and the back of the spring extends between the sidewalls in a position intermediate the rear and front walls.

3. The pecan retriever of claim 1, in which there is a finger loop at the end of the spring latch which carries the element of a detent.

4. The pecan retriever of claim 1, in which the front wall comprises two sections in angular relation.